UNITED STATES PATENT OFFICE.

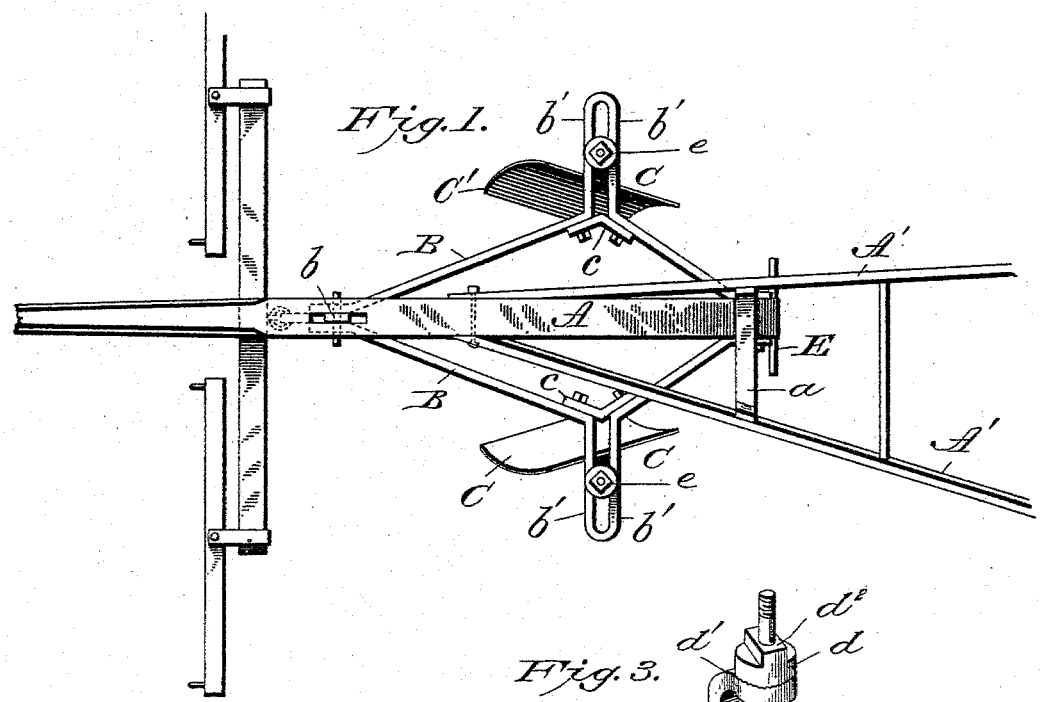
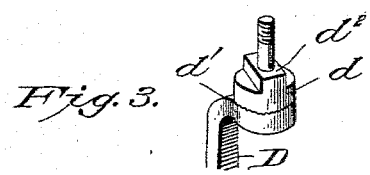
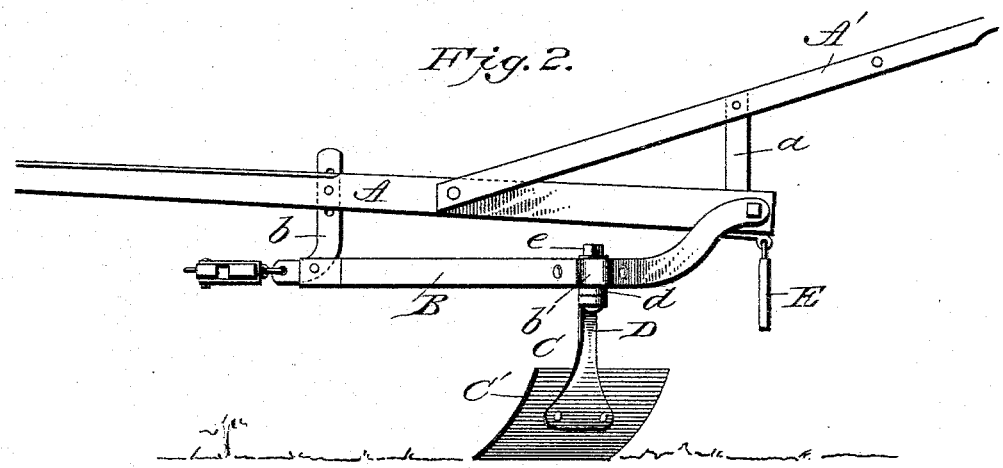

WILLIAM H. T. TOMLIN, OF SWEDESBOROUGH, NEW JERSEY, ASSIGNOR TO CHARLES HENRY MICKEL, OF SAME PLACE.

CULTIVATOR.

SPECIFICATION forming part of Letters Patent No. 494,993, dated April 4, 1893.

Application filed August 25, 1892. Serial No. 444,082. (No model.)

*To all whom it may concern:*

Be it known that I, WILLIAM H. T. TOMLIN, a citizen of the United States of America, residing at Swedesborough, in the county of Gloucester and State of New Jersey, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in straddle-row cultivators; the object of the same being to provide a cultivator which will cultivate between the rows or furrows and level the top of each furrow so that it can be better marked in the usual manner, the several parts being so constructed that they may be adjusted to regulate the space between the plows as well as the depth they enter the ground; and the invention consists in the particular construction and arrangement of the parts, as will be hereinafter fully set forth and claimed.

In the accompanying drawings forming part of this specification: Figure 1 is a plan view of the cultivator. Fig. 2 is a side view, and Fig. 3 a detail view.

A designates the beam of the cultivator, to which the handles A' are rigidly secured, the forward end of said beam being extended to form the tongue. The handles are braced to the beam by an angle plate $a$, as shown.

To the rear end of the beam is pivotally attached a frame B, which carries the plows so as to locate them on each side of said beam, the forward end of this frame being adjustably attached to the beam by a short angle-bar $b$, the upwardly projecting member of which is provided with a series of perforations which register with a perforation in the beam adapted to receive the connecting bolt. This frame is made up of two bars, which are connected to the beam at the rear end thereof by a single bolt. These side bars extend outwardly from the beam and are bent or looped to present parallel members $b'$ $b'$ between which the standards of the plows C C are secured, and from these loops the side bars converge and are attached to the beam at their forward ends by the angle-plate $b$. The draft clevis or link is attached to the forward end of this angle plate so that the draft will come directly upon the frame. Where the frame is bent to form the loops said portions are reinforced by strips $c$ $c$, which will prevent said loops spreading. The blades, C', of the plows are concave in vertical section and are rigidly secured to standards, D, the upper ends of which are bent horizontally, as at $d'$, and pierced to receive bolts which secure said standards to the frame. Between the standard and frame is interposed a washer $d$ having a squared portion $d^2$ which projects within the loop so that when the clamp nut $e$ is tightened the standard cannot turn. To further prevent the standard from turning when the angle of the blade has been adjusted, the meeting faces of the washer and horizontal portion $d'$ may be roughened or serrated. It will be noted that the plows can be adjusted to and from each other to vary the space between them, and consequently the width of the furrow, by moving the shanks of the standards in the loops. It will also be noted that by pivoting the rear end of the frame to the beam and attaching the forward end thereof to the adjustable angle-plate $b$ the depth at which the plows cut can be regulated.

At the rear end of the cultivator beam I hinge a board E, the object of which is to travel over the top of the furrow after it has been made and level the same so that said furrow can be better marked.

Having thus described my invention, what I claim as new, and desire to secure by Letters Patent, is—

1. In a cultivator, the combination of a central beam A, a frame pivotally secured to the rear end of said beam and adjustably connected to the beam at its front end by means of an angle bar having a forwardly projecting lower end to which the draft bar is attached, the frame being made up of two bars each of which is provided with outwardly bent portions forming loops, and plows adjustably secured within said loops substantially as shown, and for the purpose set forth.

2. In a cultivator the combination with the beam A, of a frame made up of two bars of metal attached to the beam at their front and rear ends, the intermediate portions of said bars being bent away from the beam and provided with loops which are reinforced by strips $c\ c$, said loops presenting members $b'\ b'$ between which the plows are secured so as to be adjustable therein, substantially as shown, and for the purpose set forth.

3. In a cultivator the combination with the beam to which the handles are secured, of a frame made up of two bars of metal which are pivotally attached to the beam at their rear ends and adjustably at their forward ends, the intermediate portions of said bars being bent away from the beam and provided with loops within which the plows are secured so as to be adjustable to and from each other to regulate the width of the furrow, together with a board hinged to the rear end of the beam for leveling the top of the furrow, substantially as shown, and for the purpose set forth.

In testimony whereof I affix my signature in presence of two witnesses.

WILLIAM H. T. TOMLIN.

Witnesses:
H. S. BEALL,
E. W. JOHNSON.